(12) United States Patent
Vander Sluis et al.

(10) Patent No.: US 8,052,190 B2
(45) Date of Patent: Nov. 8, 2011

(54) MULTI-POSITION CARGO HOLDER FOR USE IN VEHICLES

(75) Inventors: Daniel R. Vander Sluis, Rochester Hills, MI (US); Anthony D'Alessandro, Ray Township, MI (US)

(73) Assignee: Faurecia Interior Systems, Inc., Auburn Hills, MI (US)

(*) Notice: Subject to any disclaimer, the term of this patent is extended or adjusted under 35 U.S.C. 154(b) by 54 days.

(21) Appl. No.: 12/639,533

(22) Filed: Dec. 16, 2009

(65) Prior Publication Data

US 2011/0140472 A1 Jun. 16, 2011

(51) Int. Cl.
*B60R 7/04* (2006.01)
(52) U.S. Cl. ............... 296/24.34; 296/37.1; 224/282
(58) Field of Classification Search ............ 296/1.09, 296/24.34, 37.1, 37.8, 37.5, 100.01, 100.02, 296/100.03, 100.04, 100.05; 224/275, 281, 224/282, 318, 404, 432, 440, 443, 444, 507, 224/545, 548, 549, 553
See application file for complete search history.

(56) References Cited

U.S. PATENT DOCUMENTS

| | | | |
|---|---|---|---|
| 4,453,759 A * | 6/1984 | Kathiria | 296/37.8 |
| 5,383,727 A | 1/1995 | Rife | |
| 5,639,052 A | 6/1997 | Sauve | |
| 6,619,738 B1 * | 9/2003 | Filipovich | 297/188.16 |
| 7,104,580 B2 | 9/2006 | Clark et al. | |
| 7,240,814 B2 | 7/2007 | Holmberg | |
| 7,309,102 B1 | 12/2007 | Davis | |
| 7,413,229 B2 * | 8/2008 | Kukucka et al. | 296/24.34 |
| 7,415,932 B1 * | 8/2008 | Ngo | 108/44 |
| 2006/0022478 A1 | 2/2006 | DeLong | |
| 2008/0284192 A1 * | 11/2008 | Lim et al. | 296/37.5 |

* cited by examiner

*Primary Examiner* — Dennis Pedder
*Assistant Examiner* — Jason Daniels
(74) *Attorney, Agent, or Firm* — Reising Ethington P.C.

(57) ABSTRACT

A vehicle console having a cargo holder that can be moved between a stowed position and a deployed position. The cargo holder is mounted to a top of the vehicle console and includes a rigid frame and a pliable web spanning at least a portion of the frame. In its deployed position, the cargo holder extends forward of the top of the console and can be used as a flexible tray. In its stowed position, the cargo holder can rest upon the top of the console and be used as a map pocket.

12 Claims, 2 Drawing Sheets

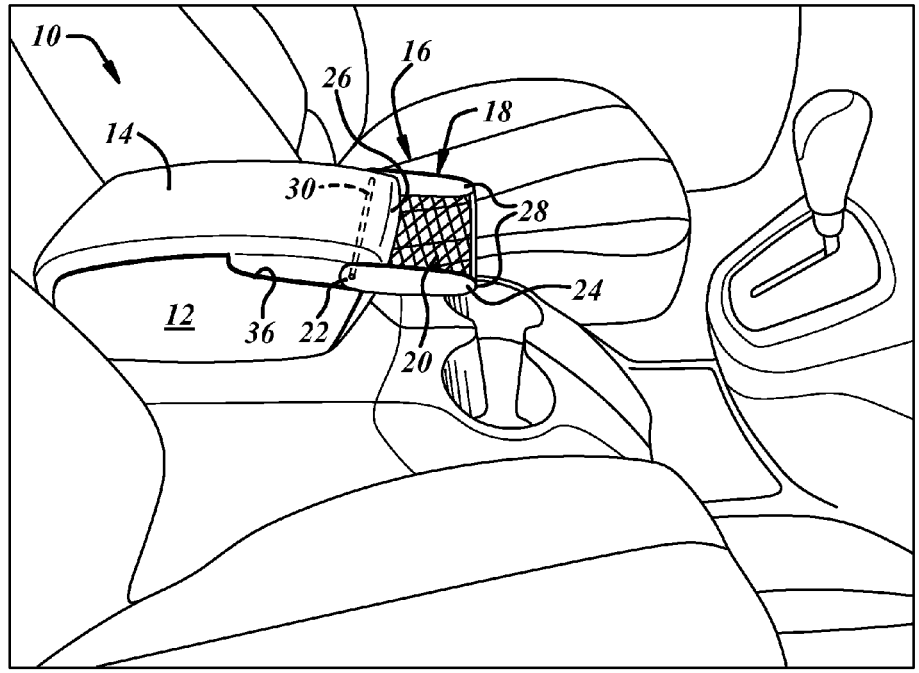
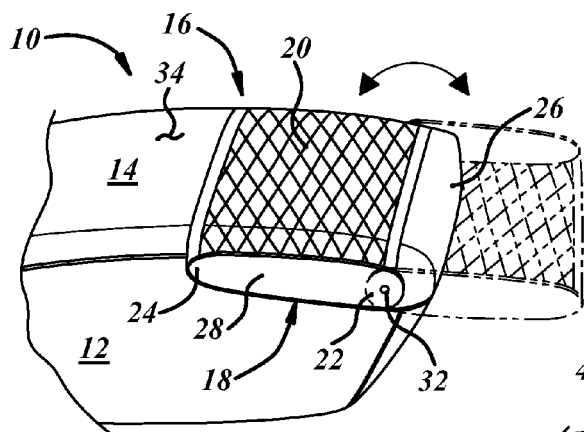
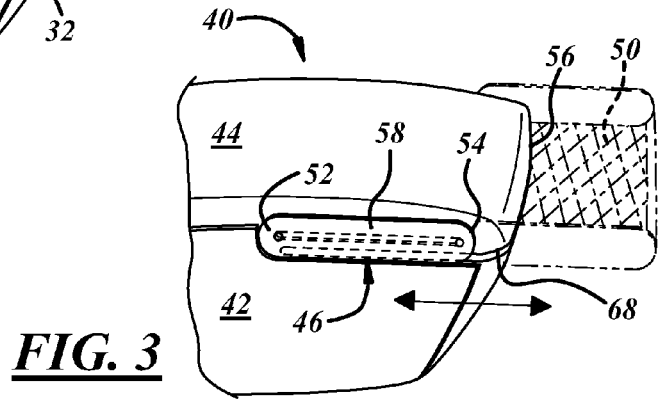

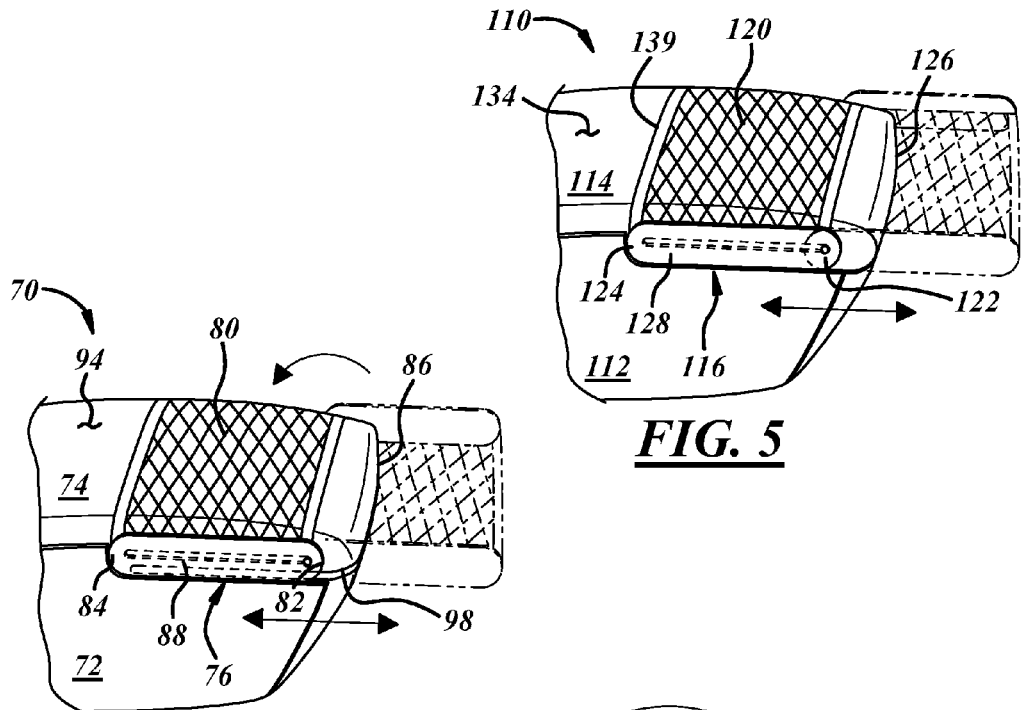
FIG. 5
FIG. 4
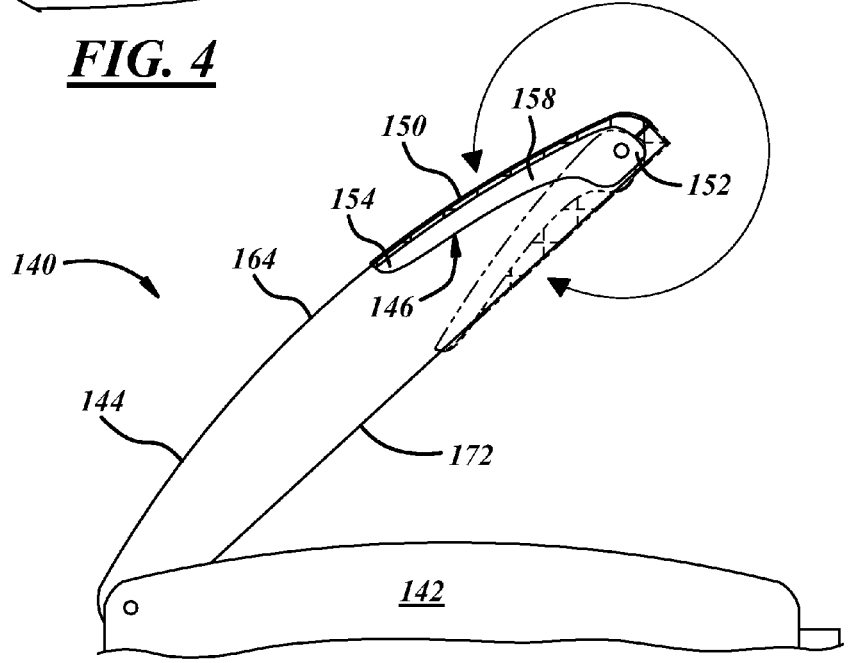
FIG. 6

US 8,052,190 B2

MULTI-POSITION CARGO HOLDER FOR USE IN VEHICLES

TECHNICAL FIELD

The present invention relates generally to cargo holders in vehicles, and more particularly to cargo holders built into vehicle center consoles.

BACKGROUND OF THE INVENTION

Vehicles are generally equipped with multiple cargo storage areas and/or cargo holders. Some examples of these include trunks, glove compartments, map pockets, cup holders, coin holders, and various general purpose trays and/or drawers. Some of the traditional types of storage areas may not be conveniently located for a driver to access while traveling; for example, glove compartments and pockets on the back of the front seats. And others, such as open trays are useful for temporarily holding items that the driver intends to take with him or her when leaving the vehicle, but may not be configured to prevent the item or items being held there from moving or rolling around within the area during vehicle acceleration, deceleration, and/or turning.

SUMMARY OF THE INVENTION

According to one aspect of the invention, there is provided a vehicle console that includes a base, a top attached to the base, and a cargo holder. The cargo holder has a constrained end supported by the base and includes a rigid frame and a pliable web spanning at least a portion of the frame. The cargo holder is moveable between a stowed position and a deployed position. When the cargo holder is in the deployed position, a free end of the cargo holder extends forward beyond a forward end of the top. When the cargo holder is in the stowed position, the free end is retracted to a position at or rearward of the forward end of the top.

In accordance with another aspect of the invention, there is provided a vehicle console that includes a base, a top attached to the base, and a cargo holder. The cargo holder has a constrained end supported by the base and includes a rigid frame and a pliable web spanning at least a portion of the frame. The cargo holder is moveable between a stowed position and a deployed position. When the cargo holder is in the deployed position, a free end of the cargo holder extends forward beyond a forward end of the top. When the cargo holder is in the stowed position, one side of substantially the entire pliable web rests against an outer surface of the top to define an expandable storage area between the pliable web and the outer surface of the top.

In accordance with another aspect of the invention, there is provided a vehicle console that includes a base, a top attached to the base, and a cargo holder. The cargo holder has a constrained end supported by the base and includes a rigid frame and a pliable web spanning at least a portion of the frame. The cargo holder is moveable between a stowed position and a deployed position and rotates about the constrained end when moved from the stowed position to the deployed position. One side of substantially the entire pliable web rests against an outer surface of the top to define an expandable storage area between the pliable web and the outer surface of the top when the cargo holder is in at least one of the positions.

BRIEF DESCRIPTION OF THE DRAWINGS

One or more preferred exemplary embodiments of the invention will hereinafter be described in conjunction with the appended drawings, wherein like designations denote like elements, and wherein:

FIG. 1 is a perspective view of an exemplary vehicle console with a cargo holder in a deployed position;

FIG. 2 is a fragmentary perspective view of an exemplary vehicle console with a cargo holder rotated to a stowed position from a deployed position;

FIG. 3 is a fragmentary perspective view of an exemplary vehicle console with a cargo holder translated to a stowed position from a deployed position;

FIG. 4 is a fragmentary perspective view of an exemplary vehicle console with a cargo holder rotated to a stowed position from a deployed position with provisions for a second stowed position;

FIG. 5 is a fragmentary perspective view of an exemplary vehicle console with a cargo holder translated to a stowed position with the web resting on the outer surface of the top of the console; and FIG. 6 is a side view of an exemplary vehicle console with a cargo holder rotated to a deployed position with the web resting on the outer surface of the top of the console from a stowed position on the bottom side of the top of the console.

DETAILED DESCRIPTION OF THE PREFERRED EMBODIMENT(S)

The exemplary vehicle consoles described herein can provide a vehicle driver or passenger with an easily accessible and safe location to temporarily hold a variety of objects or devices while in a vehicle. These vehicle consoles can include cargo holders that can support such items as mobile telephones, portable music players, and other portable electronic devices, along with various other items such as food items, writing instruments, sunglasses, etc. The cargo holders can be configured into multiple positions and in some positions can form expandable storage areas useful for securely holding maps, receipts, or other items. As will be apparent from the following description, such cargo holders can be configured to minimize or eliminate scratching, marring, or other damage to the supported items while safely securing the items during vehicle movement, thereby offering vehicle drivers and passengers an attractive alternative to traditional bins, trays, and cup holders.

With reference to FIGS. 1 and 2, there is shown an exemplary vehicle console 10 that includes a base 12, a top 14, and a cargo holder 16. The console 10 is shown located between typical bucket-style front seats in a vehicle but could also be located with one or more rows of seating behind the front seats. The top 14 comprises the upper portion of the console and can be, for example, a lid attached to the base 12. This attachment can be a hinged, journaled, or other connection that allows movement between the top 14 and the base 12, for example by using a rear, side, or front hinge. Or it can be a sliding or other type of attachment. Such moveable attachments can allow the top 14 to act as a lid that can move from a closed position to an open position to allow access to a storage compartment defined within the base 12 and located beneath the top 14 when in the closed position. The top 14 may also be affixed to the base 12 to provide a simple armrest with no storage compartment beneath the top 14, and/or the top 14 and the base 12 can be a single, integral piece. The vehicle console 10 can also be installed on bench-style or split-bench seating and/or can fold down from a seat back into its usable position.

The exemplary cargo holder 16 in FIG. 1 is shown in a deployed position and includes a rigid frame 18, a pliable web 20, a constrained end 22, and a free end 24. The constrained end 22 is supported by the base 12 and can be mounted directly to the top 14 as shown, or can optionally be mounted to the base 12. Free end 24 extends forward beyond a forward end 26 of the top 14 when the cargo holder 16 is in the deployed position as shown. In this embodiment, constrained and free ends 22, 24 are defined by the ends of first and second arms 28 that are spaced apart and located on opposite sides of top 14. The arms 28 define at least a portion of the rigid frame 18. The frame 18 can also include one or more cross-members 30 that connect the arms 28 such that the arms 28 move together when the cargo holder 16 is moved. In this embodiment, the cross-member 30 extends through the top 14 to connect the arms 28 at the constrained end 22 of the frame 18. Alternatively, or in addition, a cross-member can be included as part of frame 18 anywhere along and between arms 28, such as at free end 24.

The pliable web 20 is the portion of cargo holder 16 that directly supports or secures the cargo. It spans at least a portion of the rigid frame 18. In the exemplary embodiment shown in FIG. 1, the web 20 is attached to first and second arms 28 to span a portion of the frame 18. The portion of the frame 18 that is spanned in this example extends along the lengths of arms 28 from free end 24 generally to a position corresponding to the forward end 26 of the top 14 when the cargo holder 16 is in the deployed position. As shown, the pliable web 20 can be constructed as a cargo net having an open mesh or weave and is preferably made from a material that includes elastic properties such that it retains its shape after being subjected to relatively high levels of elongation. The pliable web 20 can also be constructed from a solid sheet of fabric that has elastic properties, such as a spandex-containing fabric. The web 20 is sufficiently elastic to be able to conform to the contour of different portions of the vehicle console 10 with which it comes in contact when the cargo holder 16 is placed in various positions, as will be further described. Generally, the material(s) from which the pliable web 20 is constructed is relatively soft compared to the rigid plastics, metals, and/or glass materials found on the exterior of most portable electronic devices so that the pliable web 20 can support such devices in a manner that reduces the probability of scratching or otherwise damaging them.

Rigid frame 18, in contrast to pliable web 20, can be constructed from a variety of materials that are sufficiently rigid to support the pliable web 20 and any cargo that the web is holding. Generally, such materials for the rigid frame 18 have stiffnesses such that the frame does not noticeably bend or flex during movement of the cargo holder 16. Some possible materials for the rigid frame 18 or its individual components include various filled or unfilled thermoplastic or thermoset polymeric materials, metals, or combinations thereof such as overmolded plastics or metals. While the frame 18 in FIG. 1 includes cross-member 30 at the constrained end 22 of the cargo holder 16, the cross-member 30 is not always necessary. For example, as will be apparent in the following descriptions of various embodiments, each of the arms 28 may include a boss or protrusion to mate with a recess or slot in the top 14 or base 12 at the constrained end 22.

With reference to FIG. 2, there is shown the forward end of the vehicle console 10 with the cargo holder 16 retracted into a stowed position by rotation, such that the free end 24 of the cargo holder is moved to a position rearward of the forward end 26 of the top 14. In this embodiment, the deployed position of the cargo holder 16 is similar to that shown in FIG. 1 and is shown in phantom. The cargo holder 16 rotates about the constrained end 22 when moved between the deployed position and the stowed position. More particularly, cargo holder 16 can rotate about an axis 32 that extends between the respective arms 28 at the constrained end 22. In embodiments that include the cross-member 30 at constrained end 22, the cross-member can include an axis that coincides with axis 32. One end of axis 32 is shown in this and other figures for clarity, but will not always be visible in practice. When this embodiment of the cargo holder 16 is rotated into the stowed position, it is inverted relative to the deployed position, though the pliable web 20 is in a substantially horizontal orientation in both positions. In the stowed position shown, one side of substantially the entire pliable web 20 rests against an outer surface 34 of the top 14 of the console to define an expandable storage area between the pliable web 20 and the top 14. In this manner, the cargo holder is useful in multiple positions for securing cargo. In this embodiment, the side of the web 20 that rests against the top 14 in the stowed position is the same side of the web that supports cargo while in the deployed position. As shown, arms 28 can be configured to nest in cut-outs 36 (shown in FIG. 1) in the base 12 and/or the top 14 such that the outer surfaces of the arms 28 are flush with the outer surfaces of the base 12 and/or top 14.

With reference to FIG. 3, there is shown the forward end of an exemplary vehicle console 40 with its cargo holder 46 retracted into a stowed position by translation or sliding. In this embodiment, the deployed position of the cargo holder 46 is also similar to that shown in FIG. 1 and is shown in phantom. The illustrated components of this embodiment are identified using reference numbers offset by 30 from the corresponding components of the embodiment of FIG. 1. The constrained end 52 of cargo holder 46 slides in a forward direction when moved from the stowed position to the deployed position, and slides in a backward direction when moved back to the stowed position. In the stowed position, the free end 54 is retracted to a position rearward of the forward end 56 of the top 44, but may be configured to be flush with the forward end of the top. In this embodiment, the pliable web 50 is not visible when in the stowed position. Rather, the pliable web 50 is retracted into an opening 68 located at the forward end 56 of the top 44. The opening 68 can be located in the top 44 itself, the base 42, or can be defined at least partially by a gap between the top 44 and base 42. The sliding mechanism depicted in hidden lines in FIG. 3 includes an elongated slot that guides the constrained end 52 in a horizontal fashion, but various other sliding mechanisms may be used. For example, arms 58 may retract into pockets formed in the base 42 or top 44 in a telescoping manner. As with the embodiment shown in FIG. 1, the pliable web 50 is in a substantially horizontal orientation in both the stowed and deployed positions.

With reference to FIG. 4, there is shown the forward end of another exemplary vehicle console 70 with the cargo holder 76 rotated into a stowed position, similar to that of the embodiment shown in FIG. 2. In this embodiment, the deployed position of the cargo holder 76 is also similar to that shown in FIG. 1 and is shown in phantom. The illustrated components of this embodiment are identified using reference numbers offset by 60 from the corresponding components of the embodiment of FIG. 1. This embodiment combines the rotating and sliding capabilities of the embodiments shown in FIGS. 2 and 3, respectively. Thus, this embodiment includes more than one stowed position. The cargo holder 76 can be rotated about the constrained end 82 to be moved from the deployed position (shown in phantom) to one stowed position, as shown, with the pliable web 80 resting against the outer surface 94 of the top 74 to define an expandable storage area as previously described. Or it can be translated or slid into opening 98 to another stowed position in situations in which vehicle occupants do not wish to use the expandable storage area and/or wish to hide it from view.

With reference to FIG. 5, there is shown the forward end of another exemplary vehicle console 110 with the cargo holder 116 translated into a stowed position. In this embodiment, the deployed position of the cargo holder 116 is also similar to that shown in FIG. 1 and is shown in phantom. The illustrated components of this embodiment are identified using reference numbers offset by 100 from the corresponding components of the embodiment of FIG. 1. The sliding movement of the cargo holder 116 from the deployed to the stowed position and back is similar to that described in connection with FIG. 3. However, in this embodiment, the pliable web 120 is arranged such that it rests against the outer surface 134 of top 114 in the stowed position. For example, a rear edge 139 of the pliable web 120 can be arranged such that its vertical position is at or above the vertical position of forward end 126 of the top 114 in the deployed position. In this manner, when the cargo holder 116 is moved from the deployed position to the stowed position, the pliable web 120 can slide along the outer surface 134 of the top 114. In this embodiment, the side of the web 120 that rests against the top 114 in the stowed position is opposite the side of the web that supports cargo while in the deployed position. Though not shown in FIG. 5, a second, hidden stowed position could also be included by providing an opening at the forward end 126 of the top 114, similar to that in the embodiment shown in and described in connection with FIG. 4.

With reference to FIG. 6, there is shown a side view of yet another exemplary vehicle console 140 with the cargo holder 146 rotated to a deployed position with the pliable web resting on the outer surface 164 of the top 144 of the console from a stowed position (shown in phantom) on a bottom side 172 of the top of the console. The illustrated components of this embodiment are identified using reference numbers offset by 130 from the corresponding components of the embodiment of FIG. 1. In this embodiment, the top 144 is shown as a lid in the open position and is pivotally connected with the base 142. When the top 144 is in the open position as shown, cargo holder 146 can be rotated about its constrained end 152. In this particular embodiment, the deployed position is similar to the stowed positions described in connection with FIGS. 2, 4, and 5 in that the pliable web 150 together with the outer surface 164 of the top 144 define an expandable storage area therebetween.

While the exemplary vehicle consoles described in connection with the figures herein all describe the cargo holder as being located generally at the forward end of its respective console, it is also possible that the cargo holder be located generally at the rearward end of the console for the convenience of passengers who may occupy seating located rearward of the console. Additionally, while the deployed and stowed positions of the cargo holders described herein all position the pliable web in a generally horizontal orientation, other non-horizontal deployed and stowed positions are possible.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A vehicle console, comprising:
a base;
a top attached to the base; and
a cargo holder having a constrained end supported by the base, the cargo holder comprising a frame and a pliable web spanning at least a portion of the frame, the cargo holder being moveable between a stowed position and a deployed position;
wherein a free end of the cargo holder extends forward beyond a forward end of the top when in the deployed position, and one side of substantially the entire pliable web rests against an outer surface of the top to define an expandable storage area between the pliable web and the outer surface of the top when the cargo holder is in the stowed position.

2. The vehicle console as defined in claim 1, wherein the cargo holder is mounted directly to said top.

3. The vehicle console as defined in claim 1, wherein the cargo holder rotates about the constrained end when moved from the stowed position to the deployed position.

4. The vehicle console as defined in claim 1, wherein the pliable web is in a substantially horizontal orientation when in the stowed position and when in the deployed position.

5. The vehicle console as defined in claim 1, wherein the frame comprises first and second arms that are spaced apart and the pliable web is attached to the first and second arms.

6. The vehicle console as defined in claim 5, further comprising a cross-member connecting the first and second arms to one another to allow the first and second arms to move together when the cargo holder is moved.

7. The vehicle console as defined in claim 1, wherein the top is movably attached to the base such that the top can be moved from a closed position to an open position to allow access to a storage compartment defined within the base and located beneath the top when the top is in the closed position.

8. A vehicle console, comprising:
a base;
a top attached to the base; and
a cargo holder having a constrained end supported by the base, the cargo holder comprising a frame and a pliable web spanning at least a portion of the frame, the cargo holder being moveable between a stowed position and a deployed position;
wherein the cargo holder rotates about the constrained end when moved from the stowed position to the deployed position and one side of substantially the entire pliable web rests against an outer surface of the top to define an expandable storage area between the pliable web and the outer surface of the top when the cargo holder is in at least one of the positions.

9. The vehicle console as defined in claim 8, wherein the pliable web is in a substantially horizontal orientation when in the stowed position and when in the deployed position.

10. The vehicle console as defined in claim 8, wherein the frame comprises first and second arms that are spaced apart and the pliable web is attached to the first and second arms.

11. The vehicle console as defined in claim 10, further comprising a cross-member connecting the first and second arms to one another to allow the first and second arms to move together when the cargo holder is moved.

12. The vehicle console as defined in claim 8, wherein the pliable web is not visible when the cargo holder is in the stowed position.

\* \* \* \* \*